United States Patent [19]

Salvador

[11] 4,268,049
[45] May 19, 1981

[54] SHOPPING CART

[76] Inventor: Thomas R. Salvador, 204 C St., South San Francisco, Calif. 94080

[21] Appl. No.: 8,592

[22] Filed: Feb. 1, 1979

[51] Int. Cl.³ .............................................. B62B 3/02
[52] U.S. Cl. ........................ 280/33.99 H; 280/47.35; 280/659
[58] Field of Search ................. 280/33.99 H, 33.99 R, 280/33.99 F, 33.99 A, 33.99 J, 47.35, 47.34, 659, 651, 639, 638

[56] References Cited

U.S. PATENT DOCUMENTS

| | | | |
|---|---|---|---|
| 2,590,285 | 3/1952 | Wiltshire | 280/33.99 H |
| 2,613,951 | 10/1952 | Rusnak | 280/651 |
| 3,039,783 | 6/1962 | Stanley | 280/33.99 H |
| 3,503,622 | 3/1970 | Romero | 280/33.99 F |
| 3,787,063 | 1/1974 | Oliver | 280/33.99 H |
| 3,999,774 | 12/1976 | Rehrig | 280/33.99 R |
| 4,046,394 | 9/1977 | Thompson, Jr. | 280/33.99 R |

FOREIGN PATENT DOCUMENTS 2537214  3/1977  Fed. Rep. of Germany ..280/33.99R

Primary Examiner—John J. Love
Assistant Examiner—Milton L. Smith
Attorney, Agent, or Firm—Phillips, Moore, Weissenberger, Lempio & Majestic

[57] ABSTRACT

A shopping cart provides a carrier adapted for carrying items, which carrier is pivotally mounted to a support. Further, a wall structure is provided, also pivotally mounted to the support, which wall structure and carrier can be pivoted to a position to provide a carrying space defined by the carrier and the wall structure. Further, the support and a base upon which the support is mounted are of molded integral, and thus relatively inexpensive, constructions and have an open end such that one of the shopping carts can be easily and conveniently nested into another of the shopping carts.

12 Claims, 6 Drawing Figures

SHOPPING CART

DESCRIPTION

1. Technical Field

The present invention relates to shopping carts, and, in particular, to shopping carts which have pivotable baskets.

2. Background Art

The prior art includes a number of shopping carts, some of which are in common use. However, these carts have a number of problems as outlined below.

First, considering the carts shown in U.S. Pat. No. 2,590,285, issued to J. D. Wiltshire on Mar. 25, 1952, and U.S. Pat. No. 3,039,783, issued to O. M. Stanley on June 19, 1962, these carts include two shopping baskets, one or both of which is pivotable between item carrying positions, and out of the way positions. However, after inspection of these patents, it can be seen that the baskets act independently of each other, and thus, cannot cooperate to define a space for carrying an item which is larger than each of the baskets.

U.S. Pat. No. 3,787,063, issued to E. J. Oliver on Jan. 22, 1974, discloses a single pivotable basket which has a movably mounted bottom wall displaceable between retracted and extended positions in accordance with the magnitude of weights supported at any time by the bottom wall. Thus, the chamber defined by the basket can be enlarged in accordance with the number of items contained therein. However, such an arrangement requires a plurality of bulky, expensive, and space-consuming mounting means for associating the bottom wall with the rest of the basket.

U.S. Pat. No. 3,999,774, issued to H. Rehrig on Dec. 28, 1976 and U.S. Pat. No. 4,046,394, issued to W. A. Thompson on Sept. 6, 1977, disclose shopping carts which have a single basket which cannot be efficiently and compactly nested into another similar shopping cart. The baskets are at least in part comprised of molded plastic. However, it is noted that the molded plastic pieces must be secured together. Thus, the complications of construction associated with the standard metallic wire shopping cart, such as that disclosed in the Oliver reference, have not been eliminated as the various plastic pieces must be similarly secured together and secured to the other metallic supporting members.

DISCLOSURE OF THE INVENTION

The present invention is directed to overcoming one or more of the problems set forth hereinabove.

In one aspect of the invention, a shopping cart is presented which has a carrying means adapted for carrying goods, and means for pivotally mounting the carrying means. Further, the shopping cart includes a wall structure, and means for pivotally mounting the wall structure such that the wall structure and the carrying means can be selectively pivoted to a position so that the wall structure and the carrying means define a carrying space.

Thus, it can be seen that the present invention solves many of the problems associated with the prior art. For example, the present invention has a shopping space which is defined by a wall structure and a carrying means acting in cooperation.

In a further aspect of the invention, the shopping cart comprises a molded, integral base and upstanding support structure having an open end adapted to nestingly receive an end of another shopping cart. Also, as the wall structure and carrying means are pivotally mounted, they can be pivoted to an out-of-the-way position, and thus with the base and support structure effect efficient and compact nesting.

Another aspect of the invention includes the wall structure, the carrying means and the base and support being comprised of molded plastic to provide a lightweight, easily constructed shopping cart. Also, the carrying means and the wall structure can be comprised of a molded plastic lattice to allow quick identification of the item contained therein.

BEST MODE FOR CARRYING OUT THE INVENTION

Figure 1:
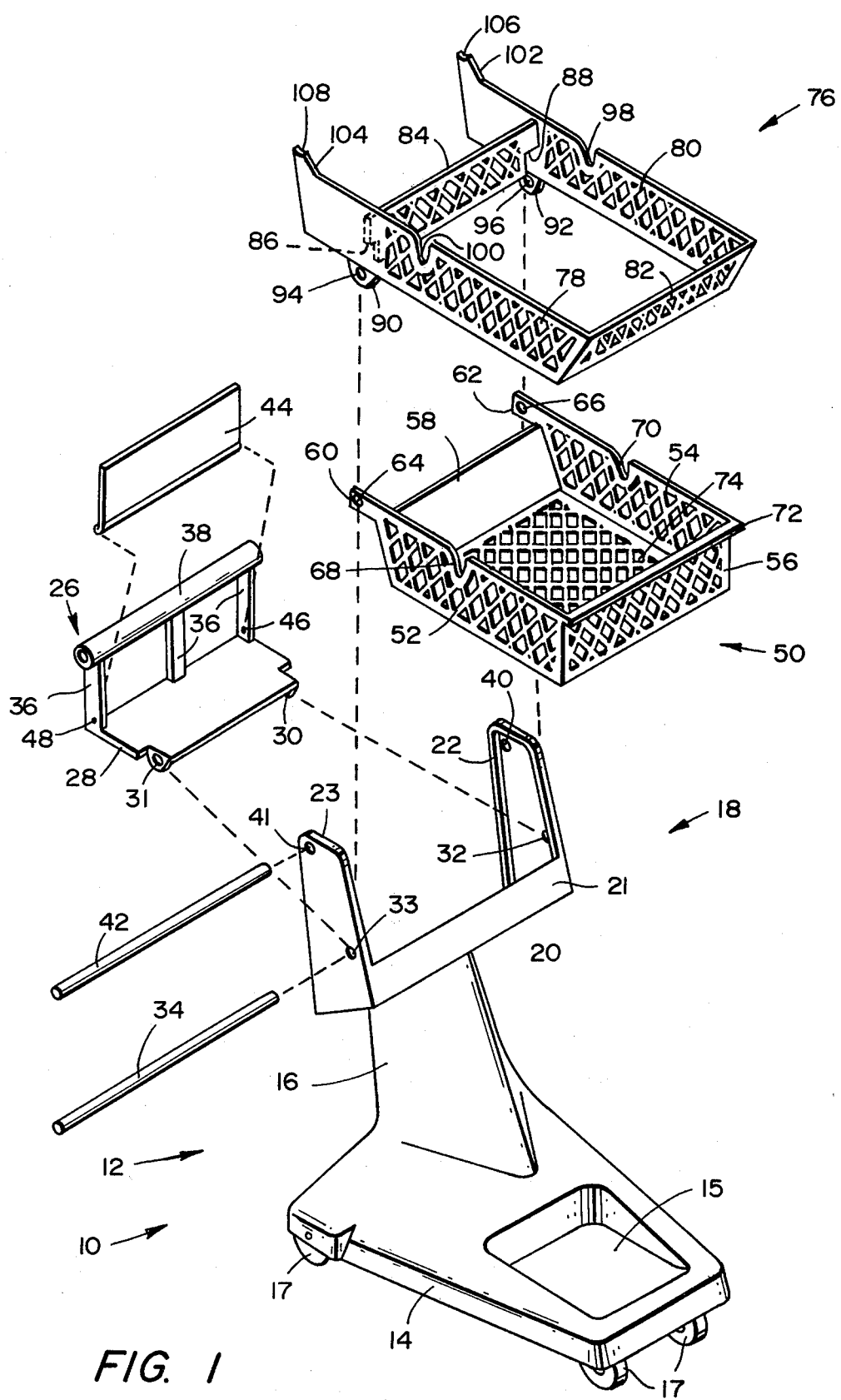
FIG. 1 is an exploded perspective view of an embodiment of the present invention.
Figure 3:
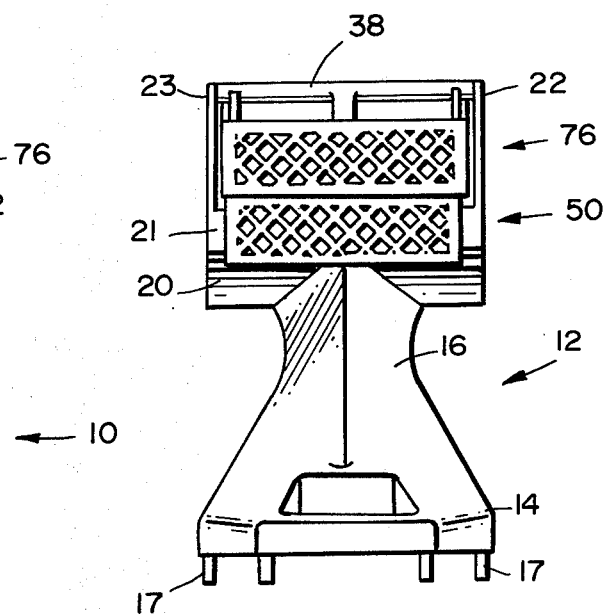
FIG. 3 depicts a front view of the embodiment of FIG. 1.
Figure 4:
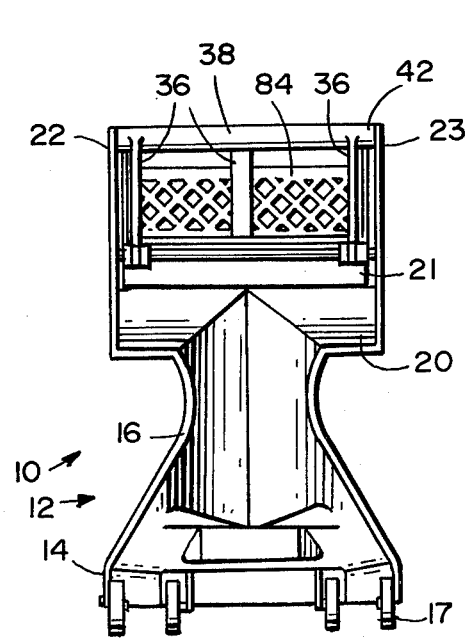
FIG. 4 is a rear view of FIG. 1.

With reference to the figures and, in particular, to FIG. 1, a shopping cart is depicted and generally denoted by the numeral 10. Shopping cart 10 includes an integral base and upstanding support arrangement 12 which defines base 14 and upstanding support 16. The upstanding support 16 extends upwardly from the base 14 adjacent the rearward portion of base 14. Recessed in the front portion of the base 14 is a generally rectangular shelf 15 which is adapted for carrying bulky items. As can be seen from a study of FIGS. 2, 3 and 4, upstanding support 16 is generally open at the rear thereof and the transverse cross-section of upstanding support 16 defines generally a U-shape. Wheels 17 are mounted to the underside of base 14 in any of the customary ways known to one of ordinary skill in this art. For example, in a preferred embodiment, the front wheels are swivelly mounted to base 14.

As seen in FIG. 1, upstanding from support 16 is a basket support frame 18 which includes a generally horizontal platform 20 and two spaced apart and generally upstanding basket supports 22 and 23. A reclining front plate 21 adds structural strength to frame 18 as it is secured to the leading edges of the supports 22 and 23, and the platform 20.

In a preferred embodiment, arrangement 12, which includes base 14, upstanding support 16, and bracket support frame 18, is of an integral, one piece, molded construction. Preferably, a plastic material, which has high strength and is easily moldable, can be used in this construction. However, in the alternative, it should be understood that metallic materials can be used. Further, the integral arrangement 12 can be constructed, if desired, of two pieces, one piece comprising the base 14 and the upstanding support 16, and the other piece comprising the bracket support frame 18.

A child's seat 26 is mounted to and between the spaced apart upstanding basket supports 22 and 23. Seat 26 includes a seat base 28 having two downwardly dependent tabs 30 and 31 each of which defines an aperture. The apertures of tabs 30 and 31 are alignable with the apertures 32 and 33 defined by the bracket supports 22 and 23 so that a dowel 34 can be slid through said apertures to secure the child's seat 26 to and between the upstanding basket supports 22 and 23. Upstanding from the seat base 28 are three spaced apart bars 36 which support an elongated tube 38 thereabove. The bars 36 are appropriately spaced such that each leg of a child may fit between two spaced bars 36. When tube 38 is properly aligned with apertures 40 and 41 which are defined by the upstanding basket supports 22 and 23, another dowel 42 can be provided through these apertures and tube 38 to secure the child's seat 26 between the upright basket supports 22 and 23. A cover flap 44 is pivotally mounted to the two exterior bars 36 immediately adjacent the seat base 28 at pivot points 46 and 48. Cover flap 44 is pivotal from a position lying on top of seat base 28 to a position immediately adjacent and against the bar 36. The former position allows the child to place his legs through the spaces defined by the bars 38, while the latter position allows items to be stored in the child's seat 26 without the possibility of such items slipping through the spaces defined between the bars 36. It is to be understood that child's seat 26 can be comprised of, in a preferred embodiment, a molded plastic material.

Shopping cart 10 further includes a basket 50 which includes sidewalls 52 and 54, front wall 56 and reclining rear wall 58. Sidewalls 52 and 54 have tabs 60 and 62 which extend rearwardly of reclining rear wall 58. Apertures 64 and 66 are defined by tabs 60 and 62, respectively. Sidewalls 52 and 54 further define arcuate slots 68 and 70, which are located somewhat closer to rear wall 58 than to front wall 56. The exact location of arcuate slots 68 and 70 will become clear during further discussions hereinbelow. Extending forwardly from front wall 56 and attached to the upper edge thereof is a lip 72. Further, basket 50 includes a bottom wall 74. In a preferred embodiment, the entire basket 50 can be comprised of molded plastic and further the walls can have an open latticed or meshed structure to allow the observation of the items stored therein. Apertures 64 and 66 are so positioned on tabs 60 and 62 that when said tabs are positioned between upstanding basket supports 22 and 23, the apertures align with the apertures 32 and 33 and also with the apertures 30 and 31 located on the seat base 28. Thus, dowel 34 can pivotally mount basket 50 between the child's seat 26 and the upstanding basket supports 22 and 23. It is noted that the basket 50 is pivotal from a first position wherein the basket is essentially horizontal (FIG. 2) and rests against the front plate 21 of the basket support frame 18 to a second position (FIG. 5) wherein the arcuate slots 68 and 70 are slid over dowels 42.

Shopping cart 10 also includes a wall arrangement 76 that is pivotally mounted above basket 50, as will be described hereinbelow. Wall arrangement 76 includes sidewalls 78 and 80, forwardly leaning front wall 82 and rear wall 84. In a preferred embodiment, wall arrangement 76 can be comprised of molded plastic in an open lattice or mesh construction.

Rear wall 84 is located between sidewall 78 and 80 at a point substantially forwardly of the rear portion of sidewalls 78 and 80. Rear wall 84 defines the forwardmost front restraint for a child that may be seated in the child's seat 26. Clearance slots 86 and 88 are defined by rear wall 84 and the sidewalls 78 and 80 and are open adjacent the lower edges of sidewalls 78 and 80. Clearance slots 86 and 84 are designed to receive basket 50 when basket 50 and wall arrangement 76 have been pivoted to second positions. Extending from sidewalls 78 and 80 immediately below rear wall 84 are a pair of tabs 90 and 92 which define apertures 94 and 96. Somewhat forwardly of rear wall 84, sidewalls 78 and 80 define arcuate slots 98 and 100. Also, extending above and slightly rearwardly of the rear end portions of sidewalls 78 and 80 are a pair of tabs 102 and 104 which define upward arcuate edges 106 and 108.

Figure 2:
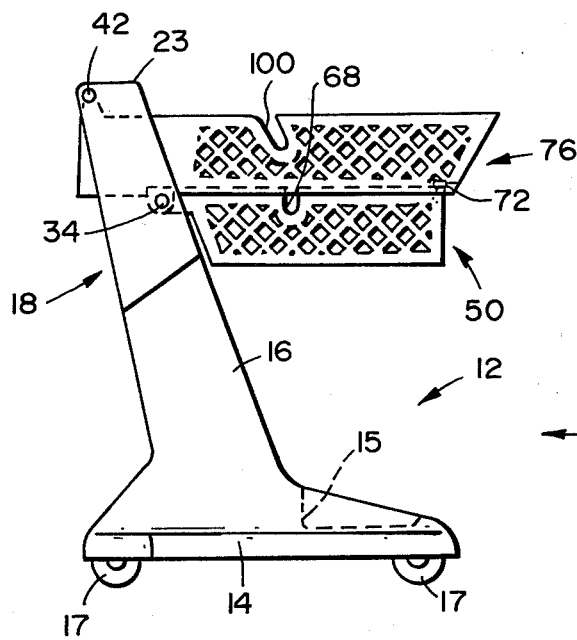
FIG. 2 is a side view of FIG. 1.

Apertures 94 and 96 are so positioned that with the wall arrangement 76 located between the upstanding basket supports 22 and 23, wall arrangement 76 can be pivotally mounted on dowel 34. It is to be understood that the width of the wall arrangement is greater than the width of the basket so that apertures 94 and 96 are located between the tabs 60 and 62 which provide for the pivotal mounting of the basket on dowel 34, and the upstanding basket supports 22 and 23. With the wall arrangement 76 in a substantially horizontal position and with said arrangement pivotally mounted on dowel 34, the upper arcuate edges 106 and 108 of tabs 102 and 104 are urged against the dowel 42 such that arcuate edge 106 is located between one of the bars 36 and aperture 40 and arcuate edge 108 is located between another of the bars 36 and aperture 41. Also, with both the wall arrangement 76 and the basket 50 in the horizontal position as depicted in FIG. 2, the lip 72 of the basket 50 contacts a lip 110 extending rearwardly from the lower edge of the forward leaning front wall 82 of the wall arrangement 76. Lip 110 supports lip 72, and thus basket 50. Wall arrangement 76 does not include a bottom wall, and thus, wall arrangement 76 and basket 50 together can define a space for the collection and storage of items.

As the wall arrangement 76 is pivoted from a first position wherein it is substantially horizontal (FIG. 2) to the second position (FIG. 5) wherein the wall arrangement 76 reclines somewhat rearwardly, the arcuate slots 98 and 100 slide over and rest against the dowel 42 and the arcuate edges 106 and 108 are disengaged from dowel 42 and pivot downwardly. With the basket 50 pivoted to a second position as depicted in FIG. 5, the basket is at least partially disposed inside the wall arrangement 76 and further sidewalls 52 and 54 of said basket are lodged in the clearance slots 86 and 88 of the sidewalls, and arcuate slots 68 and 70 are disposed about dowel 42.

Industrial Applicability

The operation of the shopping cart 10 is as follows. For purposes of directing the shopping cart 10 down, for example, the aisles of a supermarket, the tube 38 serves as a handle. The front wheels of the cart are swivelly mounted to the base thereof, and thus, the cart can be easily steered. For purposes of shopping, the wall arrangement 76 and the basket 50 are positioned in the horizontal position as depicted in FIG. 2. So arranged, the wall arrangement and basket define a large shopping space, which can accommodate very large items. If necessary, other large items can be stored on the shelf 15 recessed into the base 14. Once shopping has been completed, the cart is moved to a check out location where the items contained in the space defined by the basket and the wall arrangement are removed.

Figure 5:
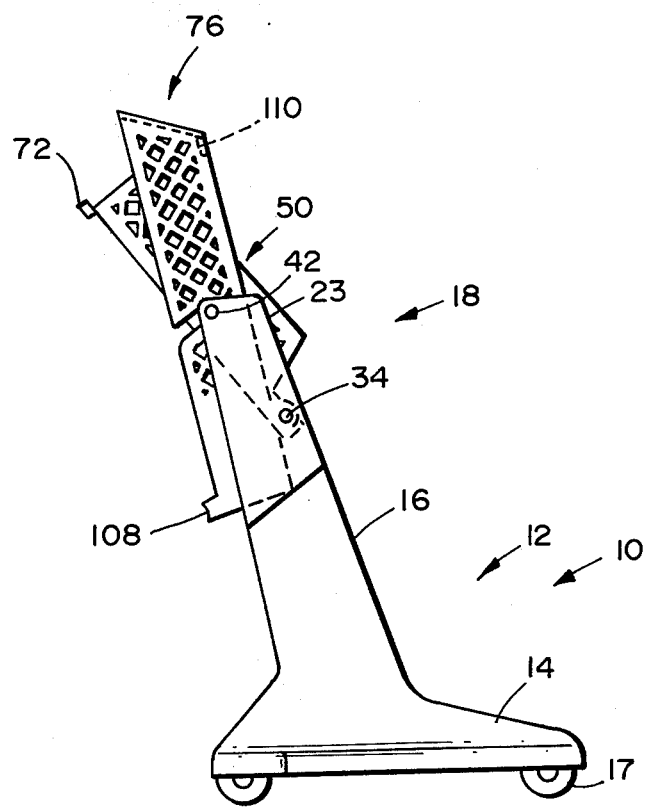
FIG. 5 is a side view of FIG. 1 with the wall structure and the carrying means pivoted to an out of the way position.

Once the shopping cart has been emptied of items, the basket 50 and wall structure 76 are pivoted to their rearwardly tilting positions, as shown in FIG. 5, preparatory to nesting one of the shopping carts 10 in another shopping cart for purposes of storage. It is noted that pivoting of the basket 50 and wall structure 76 occurs simultaneously due to the overlap of lip 72 and lip 110. However, after wall structure 76 comes to rest on dowel 42, basket 50 can be pivoted to a position wherein it is partially enclosed by wall structure 76, before finally coming to rest on dowel 42.

Figure 6:
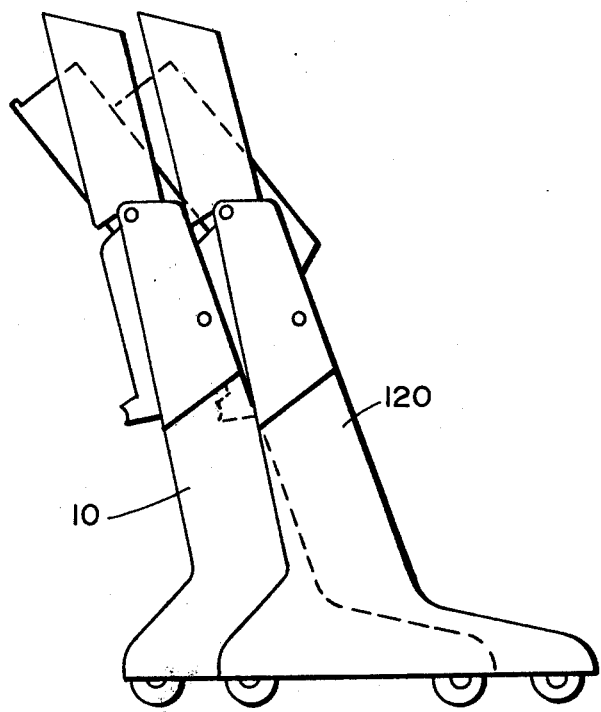
FIG. 6 is a side view showing one shopping cart nested in another.

FIG. 6 depicts shopping cart 10 nested in another shopping cart 120 which is identical to cart 10. It is to be noted that the base and upstanding support of cart 10 can quite easily nest into the rearward open end of the base and upstanding support of the other shopping cart 120. Further, as the wall arrangement and the basket of cart 10 are pivoted to the rearwardly tilting position, these do not interfere with the nesting. Also, as can be seen in FIG. 6, the basket of cart 120 reclines somewhat into the wall arrangement of cart 10.

For purposes of using the cart again to collect and store items, the reverse of the above-indicated operation is used.

Other aspects, objects and advantages of this invention can be obtained from a study of the drawings, the disclosure and the appended claims.

I claim:

1. In a shopping cart having a ground engaging base and a support extending therefrom, the improvement comprising:
    a carrying means including a basket having sidewalls and a bottom wall defining a carrying space adapted for carrying goods;
    means for pivotally mounting the basket to the support about an axis;
    a wall structure having sidewalls defining another space; and
    means for pivotally mounting the wall structure to the support such that the wall structure and the basket can be selectively pivoted about said axis to a position wherein the sidewalls of the wall structure form extensions of the sidewalls of the basket whereby the cooperate to define a combined space, which is larger than the carrying space of said basket.

2. The apparatus of claim 1 wherein the basket defines a first lip and the wall structure defines a second lip, which second lip can engage the first lip, to pivot the basket about the axis as said wall structure is pivoted about the axis.

3. The apparatus of claim 1 wherein both the basket and the wall structure are pivotal between a first and a second position, the basket being sized with respect to the wall structure so that with both the basket and the wall structure in the first position, the wall structure is positioned adjacent the basket and with both the basket and the wall structure in the second position, the basket can at least partially fit inside the another space defined by the wall structure.

4. The apparatus of claim 3 wherein the shopping cart has a handle attached to the support, the improvement further comprising the carrying means including a first groove and the wall structure including a second groove, the first and second grooves positionable about the handle with the wall structure and the carrying means in the second position.

5. The apparatus of claim 1 wherein the wall structure and the carrying means define an open plastic lattice.

6. A shopping cart comprising:
    an integral base and upstanding support having an open end adapted to nestingly receive an end of another shopping cart;
    a carrying means including a basket having sidewalls and a bottom wall defining a carrying space adapted for carrying goods;
    means for pivotally mounting the basket to the upstanding support about an axis;
    a wall structure having sidewalls defining another space;
    means for pivotally mounting the wall structure to the upstanding support about said axis, wherein both the basket and the wall structure can be pivoted to a first position wherein the sidewalls of the wall structure form extensions of the sidewalls of the carrying means to define a space which is larger than the carrying space of said basket, and wherein both the basket and the wall structure can be pivoted to a second position to facilitate the nesting of the end of the another shopping cart into said shopping cart.

7. The apparatus of claim 6 wherein the upstanding support is substantially U-shaped in cross-section.

8. The apparatus of claim 6 wherein the base and upstanding support are one piece.

9. The apparatus of claim 6 wherein the base and upstanding support are plastic.

10. The apparatus of claim 6 wherein the base and upstanding support are molded.

11. The apparatus of claim 6 wherein the basket and the wall structure are sized relative to each other so that with both the basket and the wall structure in the second position, the basket can at least partially fit inside the another space defined by the wall structure.

12. The apparatus of claim 6 wherein the base has a recessed shelf.

* * * * *

UNITED STATES PATENT AND TRADEMARK OFFICE
CERTIFICATE OF CORRECTION

PATENT NO. : 4,268,049
DATED : May 19, 1981
INVENTOR(S) : Thomas R. Salvador

It is certified that error appears in the above—identified patent and that said Letters Patent is hereby corrected as shown below:

Column 5, line 40, after "the" insert --wall structure and the basket--.

Signed and Sealed this

Eighteenth Day of August 1981

[SEAL]

Attest:

GERALD J. MOSSINGHOFF

*Attesting Officer*     *Commissioner of Patents and Trademarks*